L. H. WILBUR.
WRAPPING MACHINE.
APPLICATION FILED MAR. 3, 1910.

974,453.

Patented Nov. 1, 1910.
10 SHEETS—SHEET 10.

WITNESSES
L. Douville.
P. F. Nagle.

INVENTOR
Lawrence H. Wilbur.
BY Wiedersheim & Fairbanks,
ATTORNEYS

UNITED STATES PATENT OFFICE.

LAWRENCE H. WILBUR, OF PHILADELPHIA, PENNSYLVANIA, ASSIGNOR TO H. O. WILBUR AND SONS, INC., OF PHILADELPHIA, PENNSYLVANIA, A CORPORATION OF PENNSYLVANIA.

WRAPPING-MACHINE.

974,453.　　　Specification of Letters Patent.　　Patented Nov. 1, 1910.

Application filed March 8, 1910. Serial No. 547,018.

*To all whom it may concern:*

Be it known that I, LAWRENCE H. WILBUR, a citizen of the United States, and residing in the city and county of Philadelphia, State of Pennsylvania, have invented a new and useful Wrapping-Machine, of which the following is a specification.

This invention relates to a novel construction of wrapping machine of the class pertaining more particularly to the wrapping of pieces of confectionery, such as chocolate drops and the like and has for an object to provide a mechanism wherein a number of pieces of confectionery or other suitable articles may be placed and each piece separately controlled or manipulated in conjunction with suitable wrapping material so as to be delivered from the machine completely wrapped ready for packing or other uses, as the case may be.

It further consists of a mechanism for feeding a suitable wrapping material into position to receive an article to be wrapped; for performing a cutting operation, whereby a definite size of wrapper is secured of correct proportions for the article; for folding and manipulating the wrapper to inclose the article in such a manner that it is practically impossible for the wrapper to work loose or open and allow the article to drop out.

Throughout the specification it will be noted that reference is made to a confection known in the trade as "bud" or "chocolate bud" and it is with reference to this article that my present invention has been devised, though of course it will be understood that the machine is well adapted for wrapping a variety of articles.

It further consists of other novel features of construction, all as will be hereinafter fully set forth.

For the purpose of illustrating my invention I have shown in the accompanying drawing one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Similar numerals of reference indicate corresponding parts to the figures.

Referring to the drawings: the frame of the machine consists, in the present instance, of a base plate 1 from which rise the standards 2, supporting thereon a top plate 3, to which is secured a ring 4, forming an inclosing guide for certain coöperating parts.

5 and 6 designate, respectively, suitable bearing brackets secured to the frame of the machine and having journaled therein a shaft 7 carrying for rotation therewith, a gear 8 and a clutch member 9, the latter having a suitable feather or spline connection to permit a sliding movement relative to the shaft 7 with which it rotates. The clutch member 9 is controlled, as here shown, by a lever 10, suitably pivoted to an adjacent portion of the frame and adapted to shift the clutch member 9 into and out of engagement with a coöperating clutch member 11 secured to a driving pulley 12, the latter being loosely mounted on the shaft 7 and driven by a belt 13 from any suitable source of power. It will thus be apparent that when the two clutch members are interlocked motion is imparted to the shaft 7 and thereby transmitted to the machine proper and its adjuncts.

The gear 8 is here shown meshing with a gear 14, fixedly secured to a main shaft 15, which latter has mounted thereon, for rotation therewith a plurality of cams 16, 17, 18, 19 and 20, an eccentric 21 provided with the usual strap 22 and connecting rod 23, the sprocket wheels 24 and 25 and bevel gears 26 and 27, the function of all of which will be hereinafter described. The sprocket wheel 25 is here shown connected by a chain 28 to a second sprocket wheel 29, fixedly mounted upon a countershaft 30 suitably journaled in the frame of the machine and serving as a driving shaft for parts now to be described.

31, 32 and 33 designate, respectively, sprocket wheels which are fixedly mounted upon the countershaft 30 and 34 designates a cam likewise secured to the said countershaft 30. The sprocket wheel 31 coöperates with and drives a chain 35, which passes around a sprocket wheel 36 fixedly secured to a shaft 37 journaled in the frame of the machine and having mounted thereon a cam 38. The sprocket wheel 32 coöperates with and drives a sprocket chain 39 which passes around a sprocket wheel 40, fixedly secured on a shaft 41 also journaled in the frame of the machine and preferably carrying thereon a bevel pinion 42. The sprocket wheel 24 coöperates with and drives a chain 43 which latter passes around and imparts motion to a sprocket wheel 44, fixedly secured on a shaft 45, suitably journaled in the frame of the machine.

46 designates a crank preferably fixedly secured to the shaft 45 and as here shown, is provided with a slot 47 in which is secured the bearing of a wrist pin 48, the latter being adjustable with respect to the shaft 45 by means of screws 49 and 50 or equivalent devices, as will be readily understood.

51 designates a shaft here shown as vertically mounted in the frame of the machine and having fixedly secured thereto a crown gear 52 and a spur wheel 53, the latter being adapted to impart motion to a plurality of pinions 54, each of which is mounted on a spindle 55 and controls the movement thereof. The shaft 51, in the present instance, carries thereon a gear 56 loosely mounted thereon and meshing with a rack 57, the latter being adapted for reciprocatory movement at certain times. In connection with the gear 56 it will be noted that a disk 58 is fixedly secured thereto and preferably provided with a number of notches 59 which are adapted to coöperate with a dog 60, suitably positioned adjacent the said disk 58. In the present instance I have shown three notches in the disk 58, but of course it will be understood that if desired the number of notches may be varied to meet different conditions. 61 designates a second disk loosely mounted on the shaft 51 and preferably provided with a plurality of recesses 62 about the periphery thereof, with which coöperate a stud 63, here shown as secured to an arm 64, the latter being suitably pivoted to the top plate 3 in order to control the rotation of the disk 61. This disk 61 is preferably provided with a plurality of ratchet teeth 65, in engagement with which is a pawl 66 in order to prevent reverse movement of the said disk. Adjacent the disk 61 is a third disk 67 also loosely mounted on the shaft 51, the two disks being suitably secured together by rods 69 in order that they move in unison and it will be noted that this third disk 67 carries a pin 68 forming a pivot for the dog 60.

Figure 1:
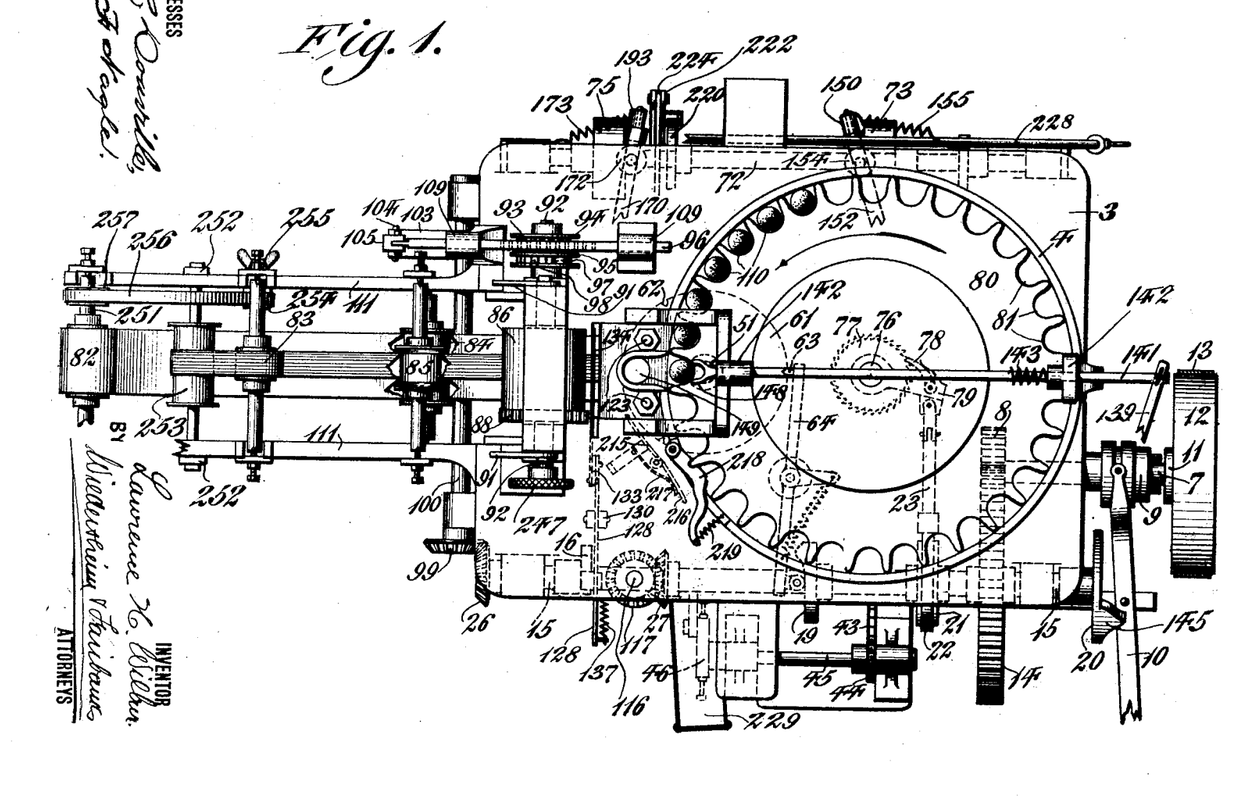
Figure 1 represents a plan of a wrapping machine embodying my invention certain parts being omitted for the sake of clearness.
Figure 2:
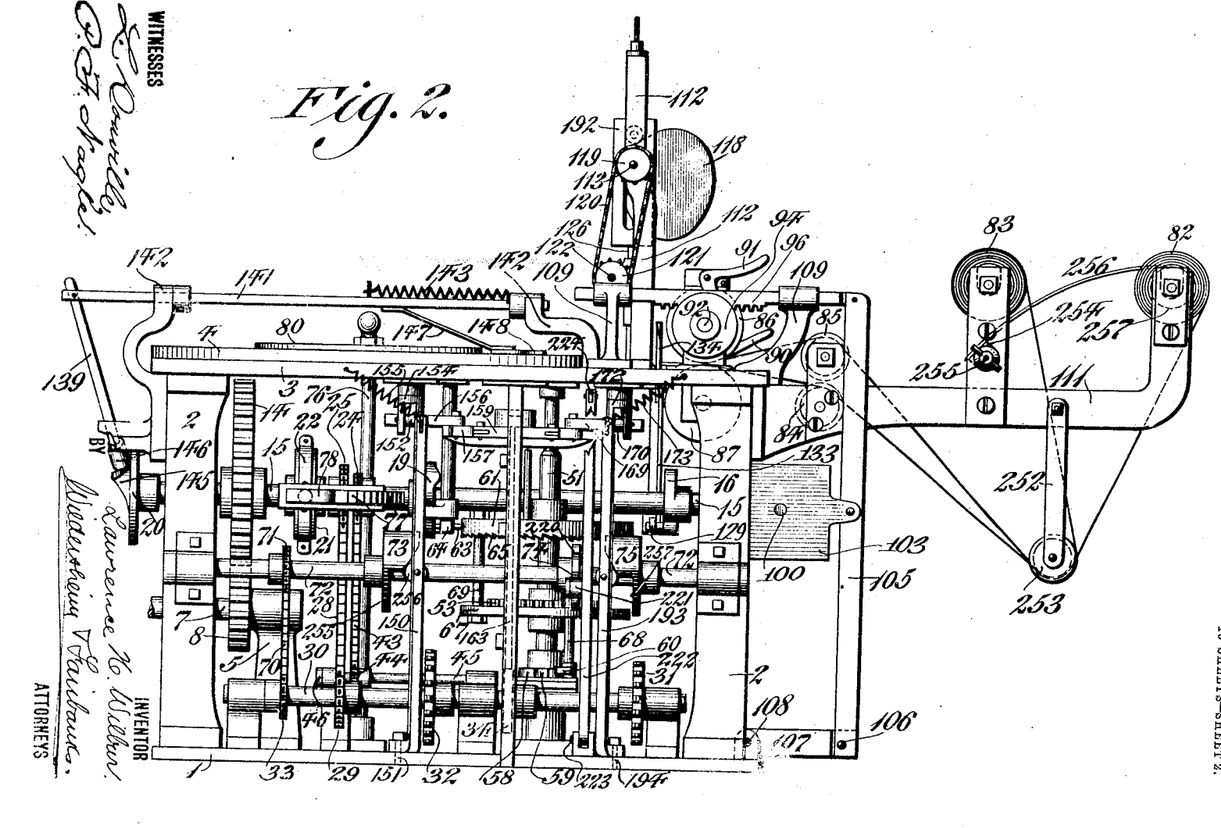
Figs. 2 and 3 represent side elevations of opposite sides of the machine.

The sprocket wheel 33 coöperates with and imparts motion to a chain 70 which also passes around a sprocket 71, preferably fast on a shaft 72 journaled in the frame of the machine and carrying thereon cams 73, 74 and 75, as will be seen by reference to Fig. 2.

76 designates a shaft preferably vertically journaled in the frame of the machine and having secured thereto a ratchet wheel 77 with which coöperates a dog 78 suitably pivoted in an arm 79, which latter is loosely mounted on the shaft 76 and receives an oscillating movement from the eccentric 21 to which it is connected by the rod 23.

80 designates a disk or carrier fixedly secured, in the present instance, to the shaft 76 and located above the top plate 3 and inclosed by the guide ring 4, it being noted that a plurality of pockets 81 are formed in the disk 80 for the purpose of receiving articles which the machine is adapted to wrap.

111 designates suitable brackets or extension arms carried by the frame which are adapted to support the material with which the confections are to be wrapped. I will describe this material as consisting of tin foil and paper so arranged that the paper is placed within the tin foil and adjacent the confection, but I desire it understood that I may employ the foil alone, if desired, the operation of the parts being the same as where the foil and paper are used together.

82 designates a roll of tin foil, which is carried on the shaft 251, suitably journaled in the brackets 111 and 83 designates a roll of paper which is suitably supported on a shaft suitably journaled in the brackets 111.

252 designates a frame suitably carried by the brackets 111, said frame carrying the roller 253, it being understood that the paper is passed around said roller 253 and the tin foil is passed around the roller 253 exterior of the paper.

84 and 85 designate suitable guide rollers which are suitably mounted on the frame of the machine, preferably adjacent the wrapping material, which are adapted to co-act and guide the material toward the machine, after which the material passes between or through the set of feed rollers 86 and 87 in order that the same will be fed properly into the machine. The tin foil in the present instance passes between the rolls 84 and 85, while the paper passes over the roll 85 before they pass between the feed rolls 86 and 87. The feed rolls operate to remove or unwind a suitable quantity of material (whether it is the paper or tin foil) from the rolls and owing to the weight of the tin foil, and the power exerted thereupon it may in some instances unroll too rapidly or improperly. To overcome this I have provided means for imparting a retarding action to the rotation of the shaft 251, which carries the roll 82 so that only the proper amount of tin foil will be unwound therefrom. In the present instance I employ a block 254 which is engaged by a threaded pin 255, in order to be held in position with respect to one of the arms, which supports the roll 83 of paper, and carried by said block is a spring arm 256 which in the present instance bears upon a roller 257 mounted on the shaft 251, whereby it will be understood that sufficient friction is provided to prevent the improper rotation of the shaft 251 and consequently the roll 82 of tin foil. The position of the block 254 with respect to its support can be varied in order to increase or diminish the tension of the spring arm 256 upon the roller 257 in order to provide the proper amount of friction to the parts.

88 designates a gear secured to the feed roll 86 and positioned in mesh with a second gear 89 fixedly secured to the feed roll 87, whereby motion imparted to one of the rolls will be immediately transmitted to the other so that they will move in unison for proper feeding movement.

It will be noted in the present instance that the roll 86 may be removed from contact with the roll 87 by means of a suitably mounted cam lever 90 in order to properly adjust the wrapping material and it will also be observed that when the roll 86 is in contact with the roll 87 a cam lever 91 is positioned to co-act therewith and prevent improper movement.

Figures 3, 4, 5:
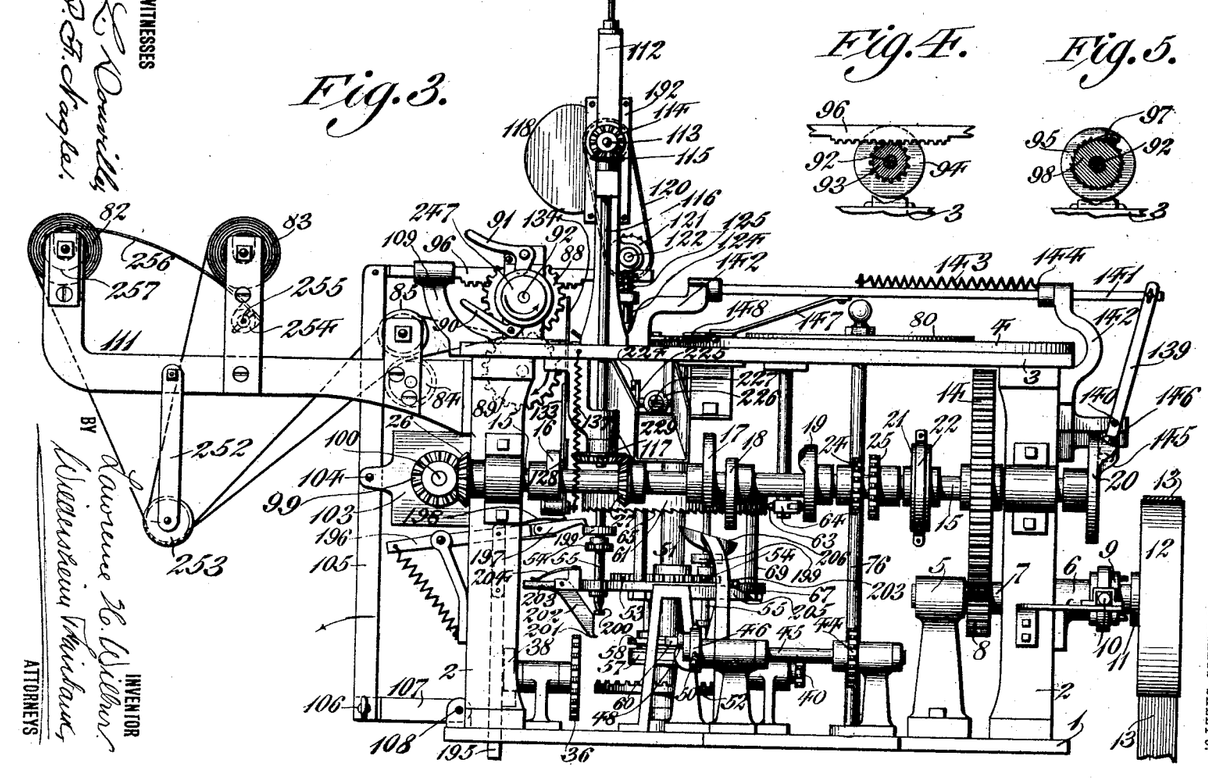
Figs. 4 and 5 represent vertical sections of certain detached portions of the machine.
Figure 6:
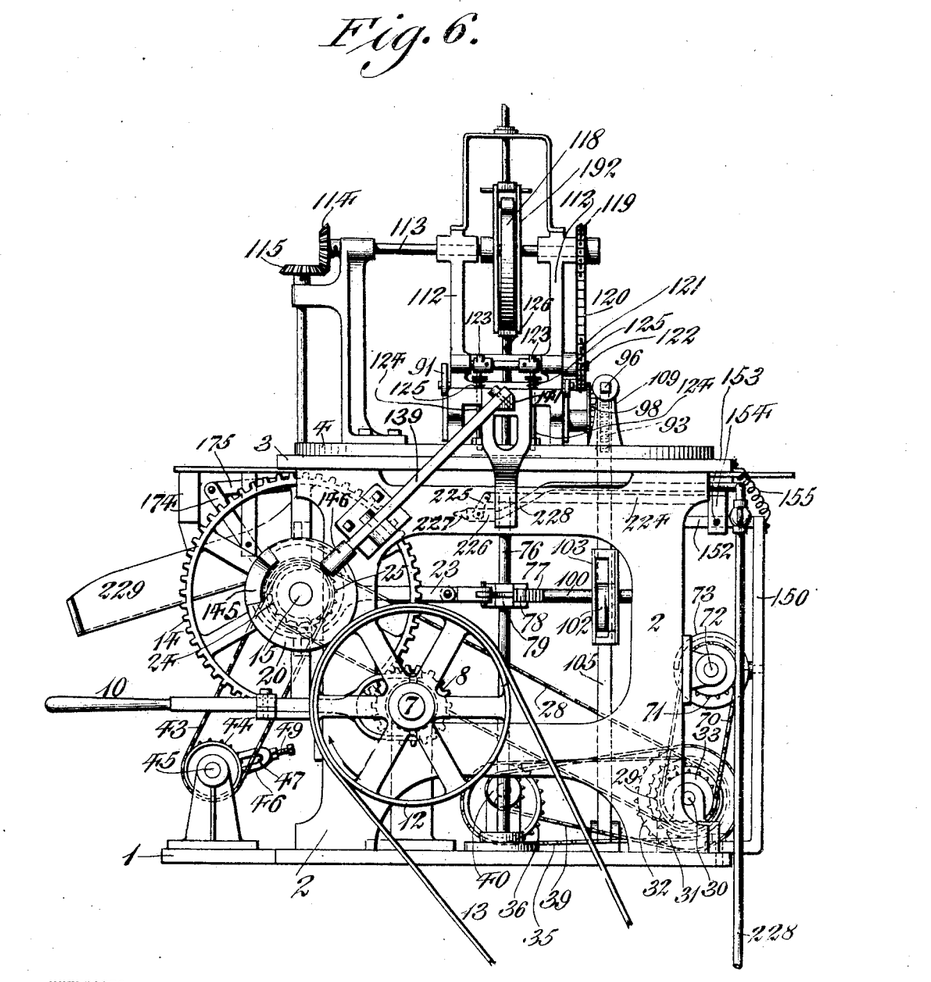
Figs. 6 and 7 represent elevations of opposite ends of the machine.
Figure 7:
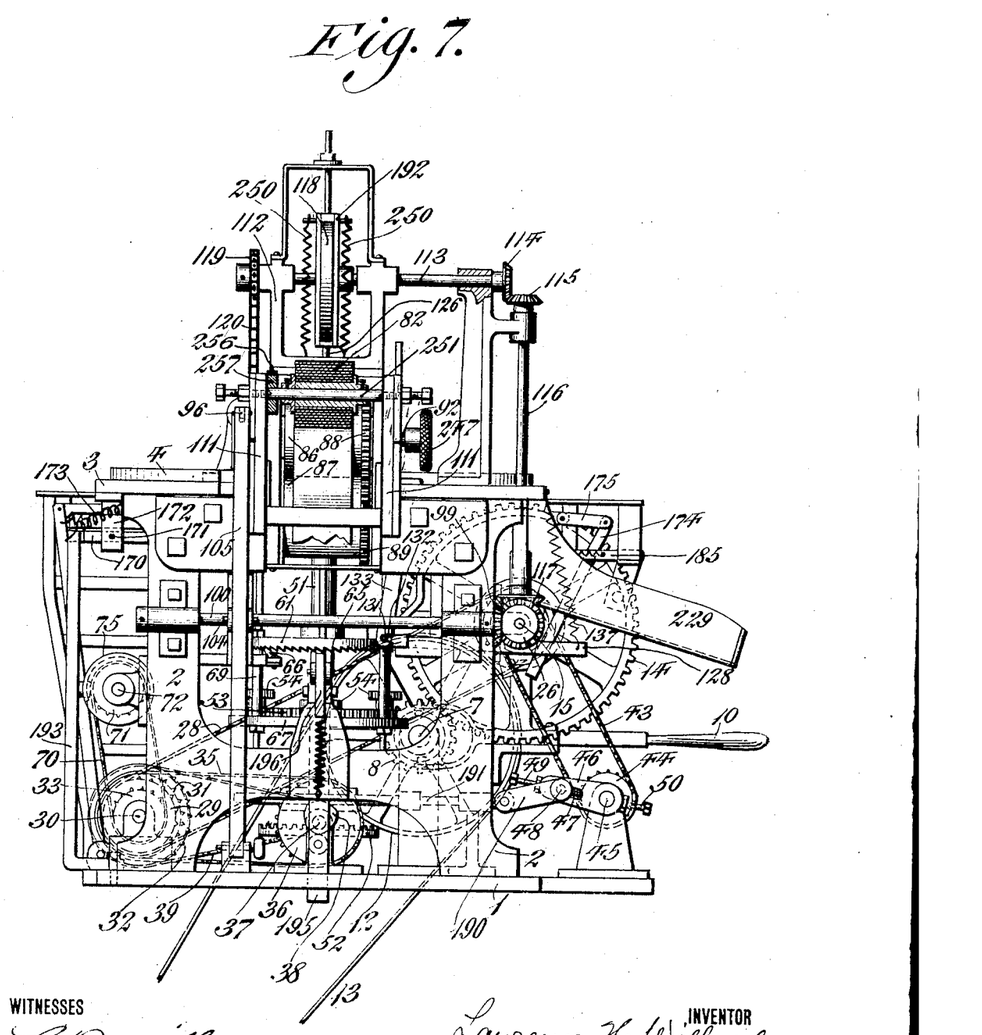

Referring to Figs. 4 and 5 92 designates a spindle upon which the roll 86 is mounted and the same also carries thereon a gear 93 having suitable flanges 94 and 95 which serve as guides for a rack bar 96, the latter being the medium for transmitting motion to the gear 93. Pivotally secured, in the present instance, to the flange 95 is a dog 97 mounted for engagement with a ratchet wheel 98 secured to the spindle 92, the connection thus formed being adapted to transmit an intermittent rotary movement of the feed roller 86 and which is transmitted through the gears 88 and 89 to the adjacent feed roll 87.

99 designates a gear preferably in mesh with the bevel gear 26 and fixedly secured to a shaft 100 journaled in the frame of the machine and upon which is mounted a plurality of cams 101 and 102 whereby a reciprocating movement is given to a cam box 103, the same having a pivotal connection 104 with a bar 105 in order to impart a rocking movement to this latter. The bar 105, in the present instance, is pivoted at 106 to one end of a link 107, the opposite end of which, as here shown, is pivoted at 108 to the frame of the machine. The opposite end of the bar 105 is preferably pivoted to one end of the rack bar 96, which latter as here shown, is guided and has a sliding movement in the guide or support 109.

112 designates standards suitably mounted on the frame of the machine and have journaled therein a shaft 113, which carries a bevel gear 114, meshing with a second bevel gear 115, fixedly secured in the present instance, on a vertical shaft 116 and provided at a suitable point, with a bevel gear 117 meshing with the bevel gear 27 of the shaft 15, as already described. The shaft 113 in the present instance has fixedly secured thereon a cam 118 and a sprocket wheel 119, the latter transmitting movement to a chain 120 which coöperates with and drives a second sprocket wheel 121 fixedly secured to a shaft 122, also journaled in the standards 112. This shaft 122 has fixedly mounted thereon, as here shown, a plurality of cams 133 which are suitably positioned to contact with and depress the rods 124 at certain times and overcome the resistance of springs 125, which latter are adapted to return the rods to normal position. The cam 118 is here shown coöperating with a yoke 192 having secured thereto a rod 126, the end of which preferably terminates in a boss 127 having a recess 128 therein, the contour of which is such as to conform approximately to the size and shape of the article which is to be wrapped.

Figures 10, 11:
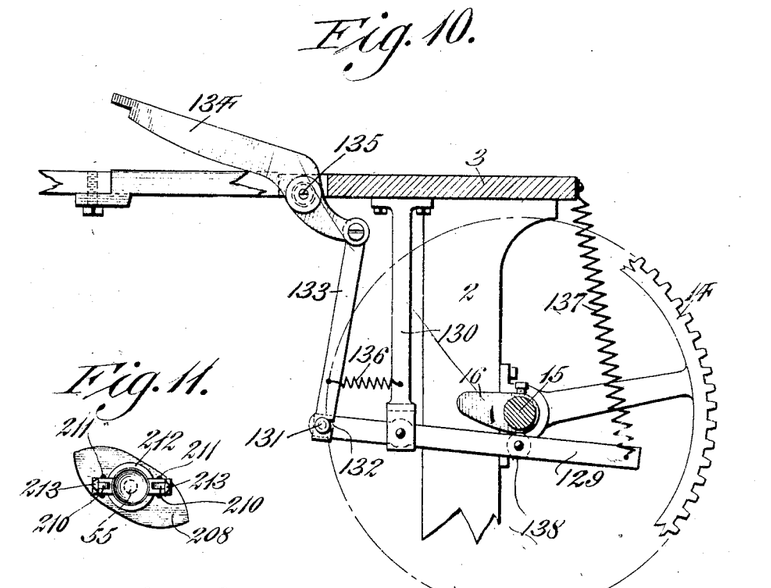
Fig. 10 represents a side elevation, partly in vertical section, of the cutting mechanism for the wrapping material.
Fig. 11 represents a plan of a carrier employed.

129 designates a lever mounted adjacent the shaft 15 and suitably positioned to be operated upon by the cam 16 and it will be noted that this lever 129 is suitably fulcrumed to a hanger 130 here shown as secured to the top plate 3, while the inner extremity of the said lever in the present instance, is provided with a pin 131 for the purpose of forming a connection with a slot 132 in the end of a link 133. The opposite end of the link 133 is suitably connected to a knife 134 pivoted at 135, as will be readily apparent from Fig. 10. This link 133 is maintained in proper relation to the pin 131 and lever 128 through the medium of a spring 136 suitably secured thereto and joined in the present instance to the hanger 130.

137 designates a spring secured to the lever 129 at one end and at its opposite end connected to a fixed portion of the machine, whereby the lever 129 is held in contact with the cam 16, it being noted that a friction roller 138 is operatively positioned between the two.

139 designates a lever suitably pivoted at 140 to the frame of the machine and being connected at one end to a rod 141 slidingly mounted in guide brackets 142, the rod being held in normal position through the medium of a spring 143 and moved in the opposite direction by means of the cam 20, a projection 145 being provided on the cam for engagement with a roller 146 journaled in the lower extremity of the lever 139. The rod 141 has secured thereto an arm 147, in the present instance terminating in a forked portion 148 of suitable contour to engage the article to be wrapped and it is operated to engage and project the article or bud 110 out of the pocket 81 and into alinement with an opening 149 suitably formed in the top plate 3.

Figure 26:
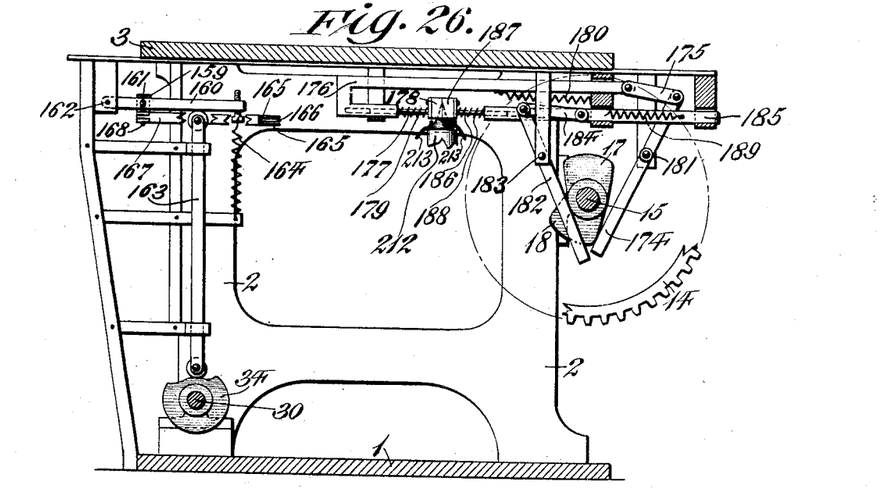
Fig. 26 represents a side elevation, partly in vertical section, of certain detached portions of the machine.
Figures 27, 28, 29, 30:
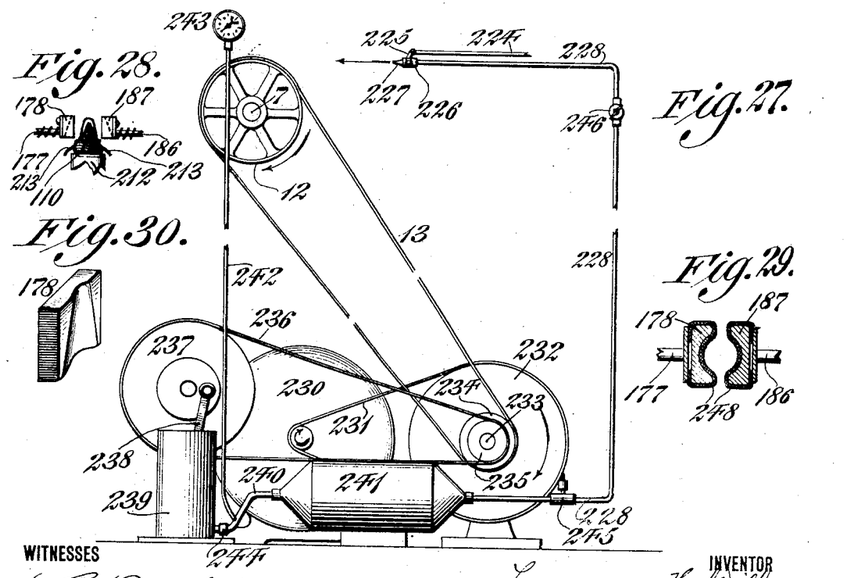
Fig. 27 represents a side elevation of a portion of the driving mechanism employed.
Fig. 28 represents a side elevation of certain detached portions of the machine.
Fig. 29 represents a horizontal section of the gripping members seen in Fig. 28.
Fig. 30 represents a perspective of a detached portion of the gripping members seen in Figs. 28 and 29.

150 designates a rod suitably pivoted at 151 to the base plate 1 of the machine and suitably mounted for coöperation with the cam 72. In the present instance the upper extremity of the rod 150 is secured to a lever 152 here shown as fulcrumed at 153 in the boss 154, the latter being pivoted in the top plate 3 of the machine frame so as to permit the lever 152 to move in the direction of the arrow $a'$ in Fig. 18 also in an upward direction. A spring 155 is suitably positioned and connected to the lever 152 in order to maintain the same in normal operative position. This lever 152 as here shown, has pivoted thereto one end of a link 156 which in turn is pivoted to a lever 157 fulcrumed at 158 in the bar 159, which latter is carried by a lever 160 and suitably secured thereto by set screws 161 or equivalent fastening means. This lever 160 in the present instance is fulcrumed at 162 in the frame of the machine and preferably coöperates with a rod 163, receiving motion from the cam 34, as will be apparent from Fig. 26. A spring 164 is suitably connected to the lever 160 in order to maintain the rod 163 in proper relation to the cam 34. The lever 157, as here shown, is provided with fingers 165, which are adapted to coöperate with a second set of fingers 166, carried by the lever 167, which latter is also fulcrumed to the bar 159 as at 168. It will be noted that the lever 167 has secured thereto a link 169 connecting it to a lever 170 which is fulcrumed at 171 in a boss 172 mounted for pivotal movement in the frame of the machine. A spring 173 is suitably connected to the lever 170 in order to properly maintain the lever 170 in position with respect to its operating member, namely the cam 75.

174 designates a lever suitably pivoted to a portion of the frame, secured at one end by a link 175 to a rod 176, in the present instance extending transversely a sufficient distance to bring the end thereof into position to coöperate with certain adjacent adjuncts. The end of this rod 176 is here shown fitted with a stem 177 carrying a block 178 thereon, which forms one of a pair of gripping members for coöperation with the wrapping material. In connection with this gripping member it will be noted that a spring 179 is positioned upon a stem 177 and allows a yielding action to take place as the gripping members are forced together.

180 designates a spring secured at one end to a fixed portion of the frame and at the other to the rod 176 whereby the latter is under a constant tension, tending to return the same to normal position and permit the lever 174 to contact with its cam 17. In connection with the lever 174 it will be noted that the same is suitably pivoted as at 181 to the frame.

182 designates a lever suitably pivoted at 183 to a portion of the main frame and having connection at one end through a link 184 with a rod 185, the said rod having a stem 186 fitted therein upon which is carried the other gripping member formed by the block 187. The stem 186 is preferably encircled by a spring 188 for the purpose of correctly positioning the gripping member and permitting a yielding movement thereof under certain pressures.

189 designates a spring secured at one end to the rod 185 and at its opposite end to a fixed portion of the machine, thereby forming a means for maintaining the lever 182 normally in contact with its cam 18.

Figure 8:
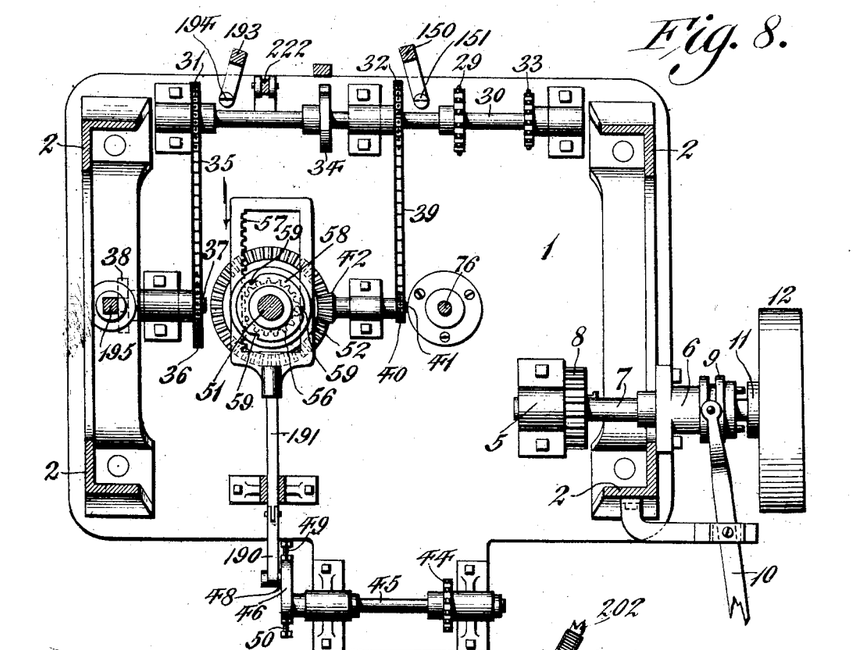
Fig. 8 represents a plan, partly in horizontal section, of certain portions in the lower part of the machine.
Figure 9:
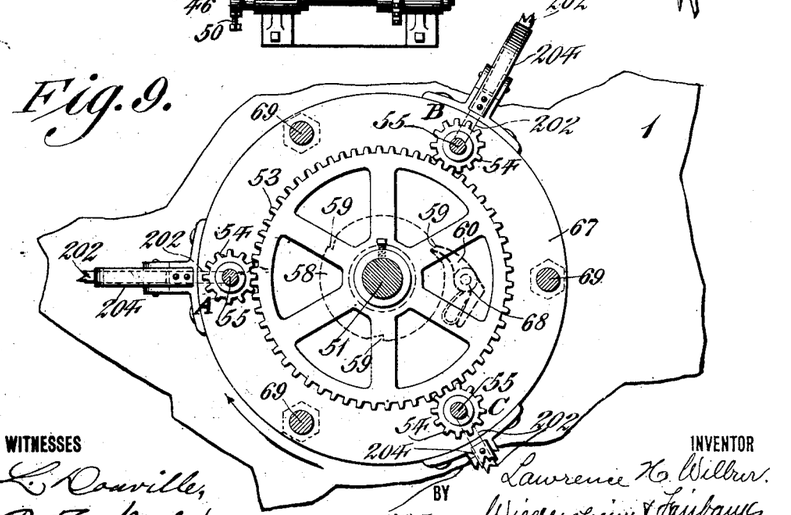
Fig. 9 represents a plan partly in horizontal section, of certain detached portions of the machine.

Referring to Fig. 8, it will be apparent that rotation of the shaft 45 produces a movement of the rack bar 57 through the intermediate connections of the link 190 and connecting rod 191.

195 designates a bar mounted for reciprocating movement in the frame of the machine and in the present instance is operated by the cam 38 in such a manner as to shift a lever 196 which is suitably pivoted to the machine and which has pivoted thereto a finger 197 controlled by a spring 198, the function of which is to maintain a finger in contact with a collar 199, fixedly secured to the spindle 55. It will of course be understood that there is a collar 199 on each spindle 55 and the finger 197 only contacts therewith as the spindles are moved into the path of said finger by the rotation of the disks 61 and 67. It will be noted that the lower extremity of each spindle is preferably provided with a shoulder 200 formed for the purpose of coöperating with the catch 201 of a latch member 202, the latter being suitably pivoted to the disk 67 and formed with an extension 203 against which a spring 204 bears to maintain the same in operative position. As heretofore explained there are in the present instance, three spindles 55 and therefore it is necessary to provide three latches 202, one for each spindle 55, and located adjacent thereto in order to coöperate therewith. The extension 203 projects sufficiently to engage a cam plate 205, preferably rigidly secured to the frame of the machine and it will be understood that the collars 199 also coöperate with a cam plate 206 similarly mounted upon the frame.

207 designates a collar, in the present instance loosely fitted on each spindle 55 and provided with a shoe 208 and ears 209, these latter forming supports for the pivots connecting the lower ends of the toggle levers 210. These levers 210 in the present instance are connected pivotally at the upper ends at 211 to a collar 212 which is fixedly secured to the spindle 55 in order to rotate in unison therewith and it will be noted that the said toggle levers 210 are each provided with a flexible jaw or gripping member 213 which is positioned so as to engage and hold a confection or like article during the wrapping operation.

Figure 12:
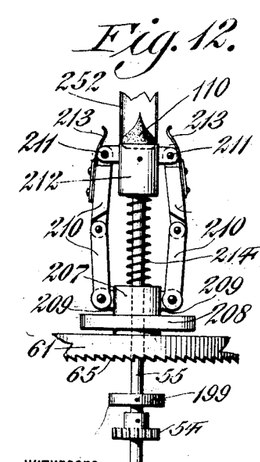
Fig. 12 represents a side elevation of the carrier seen in Fig. 11, in its normal position.

214 designates a spring encircling the spindle 55 and as here shown bears against the collar 212 on one side and the collar 207 on the other side, in order to retain the toggle lever 210 normally in the position seen in Fig. 12.

215 designates a guide plate suitably mounted adjacent the path of movement of the spindles 55 and with which the shoes 208 are adapted to contact in order to give a partial rotation to each spindle 55 as it passes this plate so that the position of the toggle levers 210 is shifted to avoid contacting with adjacent parts of the mechanism. The guide plate 215 in the present instance has pivoted thereto a plate 216 against which a spring 217 rests in order to make a yielding contact when struck by the shoes 208.

218 designates a pawl controlled by a spring 219 and adapted to prevent improper rotation of the disk 80.

Figure 16:
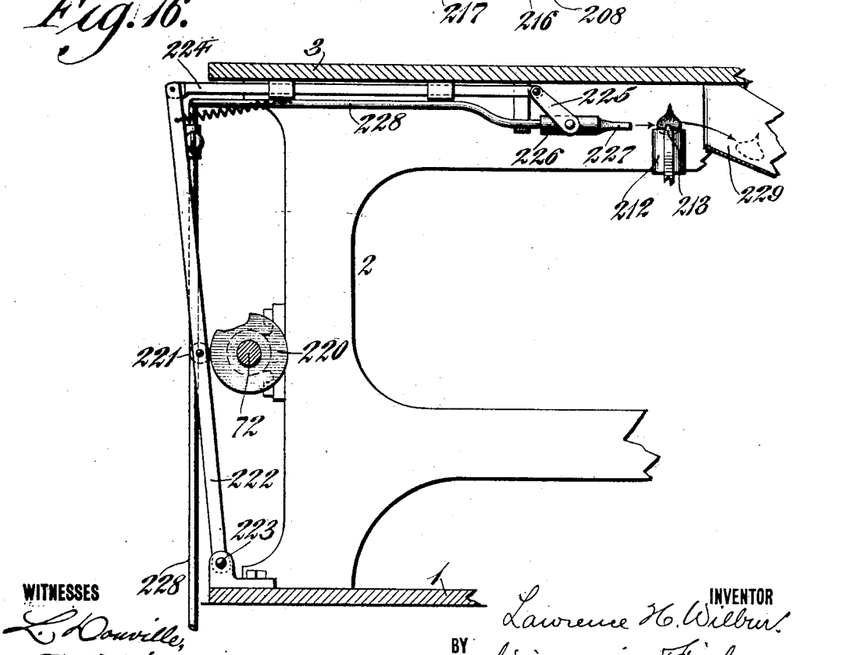
Fig. 16 represents a side elevation, partly in vertical section, of certain detached portions of the machine.

Referring to Fig. 16, 220 designates a cam fixedly secured to the shaft 72, the said cam coöperating with a roller 221 carried by a lever 222, which latter is preferably pivoted as at 223 to the frame of the machine and carries at one end a rod 224 pivoted thereto and connected by an arm 225 to the plug of a valve 226, which latter is provided with a nozzle 227 adapted to discharge fluid under pressure or air to eject the wrapped article from the machine. This valve 226 is connected to a pipe 228 receiving a supply of air or the like from any suitable source. Adjacent the nozzle 227 and preferably supported in the frame of the machine is a chute 229 adapted to receive the wrapped articles as they are ejected from the machine proper.

In the present instance the machine is driven by an electric motor 230 from which a belt 231 transmits power to a pulley 232 fixedly secured on shaft 233 and upon which are the pulleys 234 and 235. The pulley 234 drives a belt 13 which passes over the main drive pulley 12 mounted upon the main shaft 7 of the machine. The pulley 235 imparts motion to a belt 236 which in turn transmits the same to a pulley 237 and thence to a crank rod 238 of a pump or air compressor 239, which serves to force the air through a pipe 240 into a reservoir 241. The pipe 240 in the present instance has connected thereto a branch pipe 242 in which is mounted a pressure gage 243 adapted to indicate the pressure contained within the reservoir 241. The pipe 240 is also provided preferably with a check valve 244 preventing the return of the compressed air to the pump or compressor 239, as will be readily understood. The pipe 228 as here shown is provided with a safety valve 245 and an ordinary stop valve 246, the latter serving to cut off the supply of air from the reservoir 241 to the nozzle 227 when desired.

Figures 17, 18, 19, 20, 21, 22, 23, 24, 25:
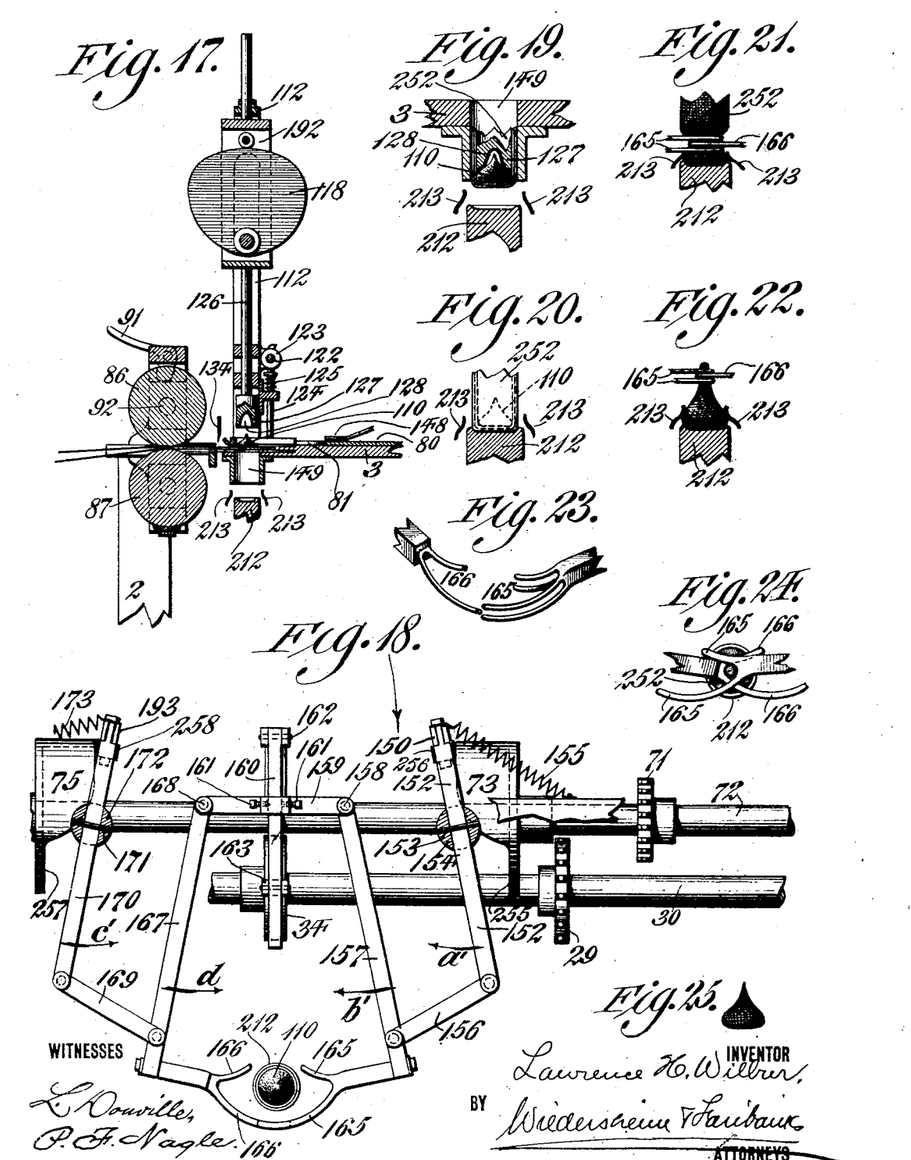
Fig. 17 represents a vertical section of certain detached portions of the machine.
Fig. 18 represents a plan of certain detached portions of the machine.
Fig. 19 represents a vertical section, on an enlarged scale, of certain detached portions of the machine and illustrates the first step in the process of wrapping an article.
Figs. 20, 21 and 22 represent side elevations of the wrapping material inclosing an article and illustrates successive steps in the process of wrapping.
Fig. 23 represents a perspective of certain of the parts seen in Fig. 18, in their normal positions.
Fig. 24 represents a plan of the parts seen in Fig. 23 in their operative position.
Fig. 25 represents a side elevation of the wrapper inclosing an article in its final or completely wrapped condition.

The operation of the device is as follows: The feed rolls 86 and 87 are first adjusted by manipulating the levers 90 and 91, ready to receive the material for wrapping the articles. As shown, this consists of tin foil and paper which are first passed around the roller 253 and the tin foil is then passed between the guide rolls 84 and 85 with the paper passing over the roll 85 and both are then passed between the feed rollers 84 and 85 and brought between the feed rolls 86 and 87, at which time the lever 90 is raised to bring the roll 86 into bearing contact with the tin foil between which and the roll 87 the paper is held and the lever 91 is then depressed to lock the roller 86 in position. The hand wheel 247 is now turned to rotate the feed rolls 86 and 87 and bring the wrapping material into alinement with the cutter blade 134, which is then operated to trim the edges of the material so as to properly locate the same relative to the parts which coöperate therewith for wrapping purposes. It will of course be understood that the blade 134 may be operated manually when the edges require trimming as for example in starting the machine. The recesses 81 of the plate 80 are now filled with buds 110 or like articles which are to be wrapped, after which the lever 10 is operated to throw the clutch member 9 into engagement with the clutch member 11, so that the motion of the revolving pulley 12 is transmitted directly to the machine operating parts. The cam 102 in its rotary movement reciprocates the cam box 103, thus giving motion to the rack bar 96 by reason of its connection with the lever 105 and thereby causes the feed rolls 86 and 87 to draw the tin foil and paper from their respective rolls 82 and 83, feeding them together over the opening 149 so as to cover the same and be in a position to receive a bud when the latter is removed from a recess 81. As soon as the material has been brought into this position the cams 123 act upon the pins 124 to bring them into engagement with the material to hold the same firmly and retain it in proper position while the cutters 134 are cutting off the proper length to wrap the articles. The movement of the blade 134 is controlled by the cam 16 mounted on the shaft 15 and its operation will be clear by reference to Fig. 10 of the drawings. The cam 20 now operates upon the lever 139 and rocks the same to shift the bar 141 in a forward direction to bring the end 148 into engagement with one of the buds 110 and push the same out of the recess 81 and upon the wrapping material just above the opening 149. As the cam 20 continues its rotation the spring 143 retracts the bar 141 and the bud is now in position for the first wrapping operation, it being understood that the holding pins 124 have at this time been removed from contact with the wrapping material through the medium of the springs 125. At this time the rotation of the cam 118 brings the springs 250 into operation and they accordingly act upon the rod 126 which is lowered and brings the socket 128 of the head 127 into engagement with and covering the bud 110, forcing the latter and its wrapping material downwardly through the opening 149, as shown in Fig. 17.

As soon as the head 127 reaches its lowermost position, the cam 38 seen in Fig. 3, depresses the rod 195, thus lowering the lever 196 and its spring pressed member 197 and as the latter is in engagement with the disk 199, the spindle 55 is also moved downwardly, thereby bringing the pinion 54 into mesh with the gear 53. Should the gear 53 at this time be so positioned that the teeth of the pinion 54 do not coincide with the spaces between the teeth, the spring 198 of the member 197 yields sufficiently to prevent injury to the gear teeth, and as soon however as the gear spaces are properly positioned, the pressure of the same spring 198 again lowers the spindle 55, completing the downward movement and properly bringing the two gears into mesh. As soon as the spindle 55 is brought into its lowermost position the tooth 201 of the finger 202 engages the shoulder 200 of the said spindle 55 and retains the latter in its lowermost position with the gears in mesh and the spindle 55 receiving a rotary movement. It will be noted at this time that the flexible grippers 213 have been brought forward by the toggle connections 210 and press the wrapping material about the article. Attention is directed to the tubular shape which has been given to the wrapping material, due to its passage through the cylindrical opening 149, thereby making it possible for the grippers 213 to accurately engage the same. The cam 19 now operates the lever 64 to remove the locking pin 63 from a recess 62 of the disk 61, thereby allowing the latter to be turned upon its shaft 51. The turning movement of disk 61 is controlled by the rotation of the shaft 45, which imparts through the arm 46 and wrist pin 48 a reciprocating movement to the rack 57, thereby causing the gear 56 to turn in a counter-clock-wise direction on the shaft 51, it being remembered that the gear wheel 56 is loose on this shaft. The rotary movement of the gear 56 is transmitted to the disk 58, whereupon one of the notches 59 in the periphery thereof is removed from engagement with the dog 60 and a second notch 59 substantially 120° distant in the present instance from the first 59, is caused to engage the said dog 60 for the next movement. The return movement of the rack 57 causes the gear 56 to turn in a clock-wise direction, thereby causing the dog 60 to turn with the disk 58 substantially one-third of a revolution and consequently through the hanger 68 shift the disk 67 and with this latter the connected disk 61. It will thus be apparent that intermittent rotary motion is imparted to the disk 61 and that said disk is locked against rotation by the pin 63 when the disk 58 is turning in a counter clock-wise direction.

Figure 13:
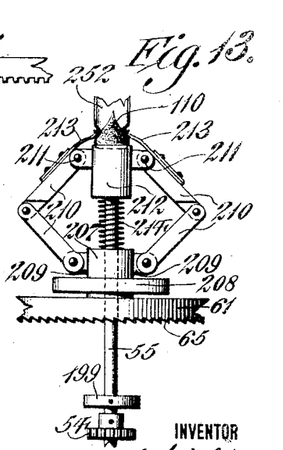
Fig. 13 represents a side elevation of the carrier seen in Fig. 12, in its operative position.
Figure 14:
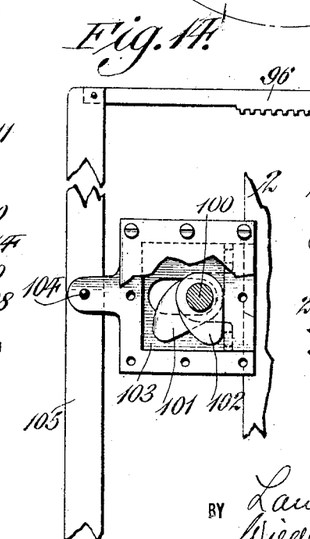
Fig. 14 represents a side elevation, partly in vertical section, of certain detached portions of the machine.
Figure 15:
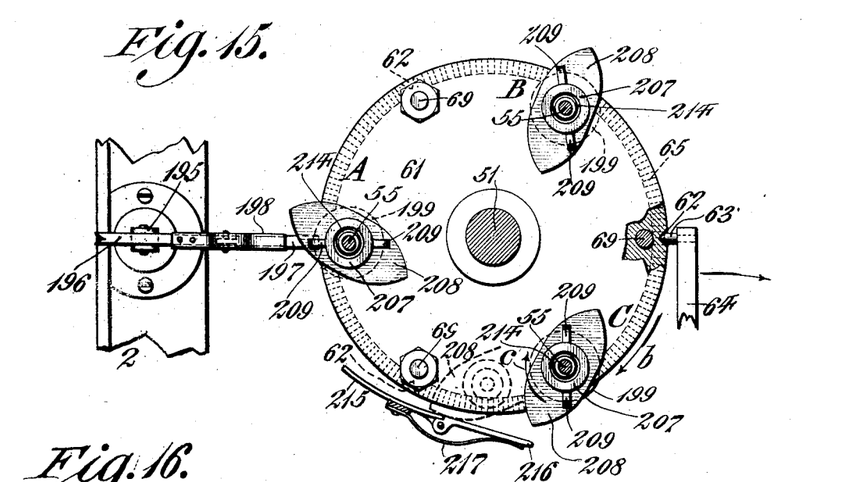
Fig. 15 represents a plan partly in horizontal section, of the carriers seen in Figs. 12 and 13 and certain of their adjuncts.

The movement of the disk 61 just described, carries the spindles 55 around and the spindle shown at A in Fig. 15, and which in the present instance is the one carrying the bud being wrapped, moves to the position indicated by the letter B. It will be understood that during this movement the gear 53 rotates continuously, thereby imparting a similar motion to the respective spindles 55, which in turn cause the bud and its wrapper to rotate likewise. The turn of the disk 61 brings the spindle 55 to the position at B, where the bud 110 and its tubular wrapper 252 are in position adjacent the fingers 165 and 166 and at this time the disk 61 remains stationary for a certain interval. due to the counter clock-wise movement of the disk 58, as previously described. During this temporary stop the cam 34 imparts a movement to the rod 163 which causes the lever 160 to turn upon its fulcrum 162 and bring the levers 157 and 167 into position so that the fingers 165 and 166 are properly alined with respect to the article being wrapped. At this time the cams 73 and 75 coöperate with the levers 152 and 170 and cause the said fingers to move in the direction of the arrow indicated at $a'$ and $c'$. The fingers 165 and 166 now assume the position seen in Fig. 21 and engage the tubular wrapping drawing the same together closely about the bud 110, as best seen in Fig. 21. The cam 34 now imparts an upward movement to the bar 163 so as to elevate the lever 160 and the fingers 165 and 166 carried thereby, thereby drawing the latter upwardly along the wrapper and as the latter is rotating at this time the material is effectually closed about the bud as best seen in Fig. 22. After this twist has been given to the wrapper, the disk 61 is again given a partial turn on the shaft 51, causing the spindle 55 and its adjuncts, to move from position B to the position indicated at C, Fig. 15, where the disk is again brought to rest and locked against rotation by the pin 63. In position C the spindle 55 is positioned adjacent and beneath the folding blocks 178 and 187, the head 212 supporting the bud 110 in its partially wrapped condition so that the upper portion of said bud and wrapper is directly in line with the said blocks 178 and 187. At this time the cams 17 and 18 have moved so that the tension of the springs 180 and 189 exerts a pull upon the respective bars 176 and 185 and the blocks 178 and 187 are moved to close upon the upper portion of the wrapper. As the spindle 55 is still rotating at this time the blocks 178 and 187 impart a final twist or pressing action to the wrapping material, resulting in the finished shape as shown in Fig. 25. As soon as this final twist has been imparted to the wrapper the blocks 178 and 187 are moved away from each other by the action of the cams 17 and 18, thus releasing their hold on the wrapping material and motion is again imparted to the disk 61 to give it another partial turn and bring the spindles 55 from the point C to the point A. During the movement of the spindle 55 from C to A the projecting portion 203 of the latch 202 contacts with the cam plate 205 and is elevated thereby to turn the latch 202 about its pivot and withdraw the tooth 201 from the shoulder 200 to release the spindle 55. The spring 214 is now free to expand and elevate the head 212 so as to return the several parts as seen in Fig. 13 to the position shown in Fig. 12. The bud at this time is now in position adjacent the chute 229 and in order that it may be ejected thereinto without interference with the gripping fingers 213 provision is made to correctly turn the spindle 55 so as to bring the grippers 213 out of interfering position. This is done by means of the cam plate 215, with which the shoe 208 is adapted to contact during the movement from C to A, thereby rendering a certain definite position of the grippers relative to the chute 229. This definite position of one of the grippers 213 is seen in Fig. 16 and the bud has a clear unobstructed passage when ejected from the machine. During the movement of the spindle from C to A and as it reaches a point opposite the chute 229 the cam 220 operates the lever 222, thus opening the valve 226 and permitting a blast of air to eject the bud from its position on the head 212 into the chute 229, from which it may be dropped or removed to a suitable receptacle.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:

1. In a machine of the character described, a frame, a drum adjacent thereto carrying a strip of material for wrapping articles, a plurality of rolls mounted on said frame for feeding said strip of material, means to produce a step by step movement of said rolls, a cutting device adjacent said rolls adapted to sever said strip of material, a support for the severed portion of said material having an opening therein, a carrier adjacent said support for a plurality of articles to be wrapped, means to feed an article to the severed portion of said material, a suitably mounted plunger adapted to pass said article and material through said opening to fold said material about said article, means to twist the folded portion of said material and means to press said twisted portion together.

2. In a machine of the character described, a frame, a drum adjacent thereto carrying a strip of material for wrapping articles, a plurality of rolls mounted on said frame for feeding said strip of material, means to produce a step by step movement of said rolls, a cutting device adjacent said rolls adapted to sever said strip of material, a support for the severed portion of said material having an opening therein, a carrier adjacent said support for a plurality of articles to be wrapped, means to feed an article to the severed portion of said material, a suitably mounted plunger adapted to pass said articles and material through said opening to fold said material about said articles, a plurality of fingers adapted to twist the folded portion of said material, and means to press said twisted portion together.

3. In a machine of the character described, a frame, a drum adjacent thereto carrying a strip of material for wrapping articles, a plurality of rolls mounted on said frame for feeding said strip of material, means to produce a step by step movement of said rolls, a cutting device adjacent said rolls adapted to sever said strip of material, a support for the severed portion of said material having an opening therein, a carrier adjacent said support for a plurality of articles to be wrapped, means to feed an article to the severed portion of said material, a suitably mounted plunger adapted to pass said articles and material through said opening to fold said material about said articles, a plurality of fingers adapted to twist the folded portion of said material, and a plurality of blocks adapted to press said twisted portion together.

4. In a machine of the character described, a frame, a drum adjacent thereto carrying a strip of material for wrapping articles, a plurality of rolls mounted on said frame for feeding said strip of material, means to produce a step by step movement of said rolls, a cutting device adjacent said rolls adapted to sever said strip of material, a support for the severed portion of said material having an opening therein, a carrier adjacent said support for a plurality of articles to be wrapped, means to feed an article to the severed portion of said material, a suitably mounted plunger adapted to pass said articles and material through said opening to fold said material about said articles, a plurality of fingers adapted to twist the folded portion of said material, a plurality of blocks adapted to press said twisted portion together, and means to eject the wrapped article from said machine.

5. In a machine of the character described, a frame, a drum adjacent thereto carrying a strip of material for wrapping articles, a plurality of rolls mounted on said frame for feeding said strip of material, means to produce a step by step movement of said rolls, a cutting device adjacent said rolls adapted to sever said strip of material, a support for the severed portion of said material having an opening therein, a carrier adjacent said support for a plurality of articles to be wrapped, means to feed an article to the severed portion of said material, a suitably mounted plunger adapted to pass said articles and material through said opening to fold said material about said articles, a plurality of fingers adapted to twist the folded portion of said material, a plurality of blocks adapted to press said twisted portion together, and a suitably controlled air blast to eject the wrapped articles from said machine.

6. In a machine of the character stated, a frame, a support thereon having an opening therein, means to hold a strip of material over said opening, a plunger suitably operated to press a suitable article and said strip of material through said opening, a member rotatably mounted below said support, a plurality of holders rotatably secured to said member, means to pass said holders successively beneath said opening to receive an article and strip of material from said opening, and means to reciprocate each holder relative to said member.

7. In a machine of the character described, a frame, a support thereon having an opening therein, means to hold a strip of material over said opening, a plunger suitably operated to press a suitable article and said strip of material through said opening, a disk horizontally disposed below said opening and rotatably mounted, a plurality of holders carried by said disk and vertically disposed relative thereto, each adapted to receive an article and material, a plurality of gripping members, and means to shift said gripping members to fold said material about said articles.

8. In a machine of the character described, a frame, a support thereon having an opening therein, means to hold a strip of material over said opening, a plunger suitably operated to press a suitable article and said strip of material through said opening, a disk rotatably mounted below said support, a plurality of holders rotatably secured to said disk, means to pass said holders successively beneath said opening to receive an article and strip of material from said opening and means to reciprocate each holder relative to said disk.

9. In a machine of the character stated, a frame, a support thereon having an opening therein, means to hold a strip of material over said opening, a plunger suitably operated to press a suitable article and said strip of material through said opening, a disk rotatably mounted below said support, a plurality of holders rotatably secured to said disk, means to pass said holders successively beneath said opening to receive an article and strip of material from said opening, means to rotate said holders with respect to said disk, and means to reciprocate each holder with respect to said disk.

10. In a machine of the character described, a frame, a support thereon having an opening therein, means to hold a strip of material over said opening, a plunger suitably operated to press a suitable article and said strip of material through said opening, a disk rotatably mounted beneath said support, a plurality of holders rotatably carried by said disk, means to rotate said disk to position a holder beneath said opening at a predetermined time, means to rotate each holder and means to reciprocate each holder with respect to said disk.

11. In a machine of the character described, a frame, a support thereon having an opening therein, means to hold a strip of material over said opening, a plunger suitably operated to press a suitable article and said strip of material through said opening, a disk rotatably mounted beneath said support, a plurality of holders rotatably carried by said disk and slidingly mounted with respect thereto, each holder being adapted to receive an article and strip of material from said opening, means to fold said material about said article and means to rotate each holder.

12. In a machine of the character described, a frame, a support thereon having an opening therein, means to hold a strip of material over said opening, a plunger suitably operated to press a suitable article and said strip of material through said opening, a disk rotatably mounted beneath said support, a plurality of holders rotatably carried by said disk and slidingly mounted with respect thereto, each holder being adapted to receive an article and strip of material from said opening, means to fold said material about said article, means to press said folded material about said article and means to rotate each holder.

13. In a machine of the character described, a frame, a support thereon having an opening therein, means to hold a strip of material over said opening, a plunger suitably operated to press a suitable article and said strip of material through said opening, a disk rotatably mounted beneath said support, a plurality of holders rotatably carried by said disk and slidingly mounted with respect thereto, each holder being adapted to receive an article and strip of material from said opening, means to fold said material about an article carried by one holder, and means to simultaneously twist a previously folded material about an article carried by another holder.

14. In a machine of the character described, a frame, a support thereon having an opening therein, means to hold a strip of material over said opening, a plunger suitably operated to press a suitable article and said strip of material through said opening, a disk rotatably mounted beneath said support, a plurality of holders carried by said disk, each holder being adapted to receive an article and strip of material from said opening, means to fold said material about an article carried by one holder, means to simultaneously twist a previously folded material about an article carried by another holder, and means to press a previously twisted material about an article carried by still another holder.

15. In a machine of the character described, a frame, a support thereon having an opening therein, means to hold a strip of material over said opening, a plunger suitably operated to press a suitable article and said strip of material through said opening, a disk mounted beneath said support, a plurality of holders carried by said disk adapted to receive said article and strip of material, folding, twisting and pressing mechanisms and means to successively shift said disk to bring each holder into operative relation with said folding mechanism, said twisting mechanism and said pressing mechanism.

16. In a machine of the character described, a frame, a support thereon having an opening therein, means to hold a strip of material over said opening, a plunger suitably operated to press a suitable article and said strip of material through said opening, a disk mounted beneath said support, a plurality of holders carried by said disk adapted to receive said article and strip of material, folding, twisting, pressing and ejecting mechanisms, and means to successively shift said disk to bring each holder into operative relation with said folding mechanism, said twisting mechanism, said pressing mechanism, and said ejecting mechanism.

17. In a machine of the character stated, a frame, a drum adjacent thereto carrying a strip of material for wrapping articles, a plurality of rolls mounted on said frame for feeding said strip of material, means to produce a step-by-step movement of said rolls, a cutting device adjacent said rolls adapted to sever said strip of material, a support for the severed portion of said material having an opening therein, means to feed an article to the severed portion of said material, a suitably mounted plunger adapted to pass an article and material through said opening to fold said material about said article, a disk rotatably mounted beneath said opening, a plurality of holders slidingly mounted on said disk and adapted to rotate with respect thereto, means adjacent said holders for twisting the folded portion of said material about said article, and means to intermittently rotate said disk.

18. In a machine of the character stated, a frame, a disk rotatably mounted thereon and horizontally disposed, a plurality of holders slidingly mounted on said disk and adapted for rotation relative thereto, means to feed a partially wrapped article to each holder, a plurality of gripping members carried by each holder, and means to shift each holder relative to said disk, whereby said gripping members are brought into engagement with said wrapping material.

19. In a machine of the character stated, a frame, a disk rotatably mounted thereon and horizontally disposed, a plurality of holders slidingly mounted on said disk and adapted for rotation relative thereto, means to feed a partially wrapped article to each holder, a plurality of gripping members carried by each holder, means to shift each holder relative to said disk whereby said gripping members are brought into engagement with said wrapping material, and a lock for retaining each holder in shifted position.

20. In a machine of the character stated, a frame, a disk rotatably mounted thereon, a plurality of holders carried by said disk and slidingly and rotatably mounted with respect thereto, means to feed a partially wrapped article to each holder, toggle mechanism carried by each holder, gripping members mounted on said toggle mechanism and adapted to engage said wrapping material, and means to shift each holder relative to said disk, whereby said toggle mechanism is operated.

21. In a device of the character stated, a frame, a member rotatably mounted thereon and horizontally disposed, a plurality of holders slidingly mounted on said member and adapted for rotation relative thereto, means to feed a partially wrapped article to each holder, a plurality of gripping members carried by each holder, and means to shift each holder relative to said member whereby said gripping members are brought into engagement with said wrapping material.

22. In a machine of the character stated, a frame, means for carrying a strip of material for wrapping articles, a step by step mechanism for feeding said strip of material, a cutting device adapted to sever said strip of material, a support for the severed portion of said material having an opening therein, a carrier adjacent said support for a plurality of articles to be wrapped, means to feed an article to the severed portion of said material, a suitably mounted plunger adapted to pass said article and material through said opening to fold said material about said article, means to twist the folded portion of said material, and means to press said twisted portion together.

LAWRENCE H. WILBUR.

Witnesses:
W. E. HOTCHKINS,
I. ARCHER RUTON.